US008572223B2

(12) United States Patent
Mansilla

(10) Patent No.: US 8,572,223 B2
(45) Date of Patent: Oct. 29, 2013

(54) SYSTEM AND METHOD FOR UTILIZING EVENT TEMPLATES IN AN EVENT MANAGER TO EXECUTE APPLICATION SERVICES

(75) Inventor: Denny Mansilla, Hercules, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 695 days.

(21) Appl. No.: 11/490,765

(22) Filed: Jul. 20, 2006

(65) Prior Publication Data

US 2008/0021990 A1    Jan. 24, 2008

(51) Int. Cl.
*G06F 15/173*      (2006.01)
*G06F 15/16*       (2006.01)

(52) U.S. Cl.
USPC ............ 709/223; 709/224; 709/226; 709/229

(58) Field of Classification Search
USPC .................................. 709/223, 224, 226, 229
See application file for complete search history.

(56) References Cited

U.S. PATENT DOCUMENTS

| | | | |
|---|---|---|---|
| 6,353,851 B1 | 3/2002 | Anupam et al. | 709/204 |
| 6,535,912 B1 | 3/2003 | Anupam et al. | 709/217 |
| 6,779,155 B1 | 8/2004 | Bahrs et al. | 715/526 |
| 6,829,771 B1 | 12/2004 | Bahrs et al. | 719/318 |
| 6,886,170 B1 | 4/2005 | Bahrs et al. | 719/318 |
| 6,944,662 B2 * | 9/2005 | Devine et al. | 709/225 |
| 6,976,244 B2 | 12/2005 | Akella et al. | 717/116 |
| 7,003,768 B2 * | 2/2006 | Daynes et al. | 718/1 |
| 7,010,537 B2 | 3/2006 | Eyal et al. | 707/100 |
| 7,209,916 B1 * | 4/2007 | Seshadri et al. | 1/1 |
| 2002/0107905 A1 * | 8/2002 | Roe et al. | 709/202 |
| 2003/0074440 A1 * | 4/2003 | Grabarnik et al. | 709/224 |
| 2004/0083195 A1 * | 4/2004 | McCord et al. | 706/47 |
| 2005/0091640 A1 * | 4/2005 | McCollum et al. | 717/117 |
| 2005/0132400 A1 | 6/2005 | Liao et al. | 725/32 |
| 2006/0080120 A1 * | 4/2006 | Tcherevik | 705/1 |
| 2006/0080432 A1 | 4/2006 | Spataro et al. | 709/224 |

OTHER PUBLICATIONS

Pending U.S. Appl. No. 09/672,684, entitled Method and System for Processing Transaction, inventors Neal L. Goldstein et al., filed Sep. 28, 2000.
Pending U.S. Appl. No. 10/032,222, entitled Distributed Computing System Architecture, inventors Neal L. Goldstein et al., filed Dec. 19, 2001.

* cited by examiner

*Primary Examiner* — Ashok Patel
*Assistant Examiner* — Lawrence Cosby
(74) *Attorney, Agent, or Firm* — Kilpatrick Townsend & Stockton LLP

(57) ABSTRACT

A method and apparatus in a distributed processing system for implementing different business function applications. A plurality of common utility systems which provide for performing different operations can be utilized by different event manager modules which operate to implement the different business function application. The development and implementation of new business function applications can be streamlined by using the common utility systems across a number of different event manager modules which implement different business function applications. Additionally, various event manager modules, and event templates within the event manager modules can operate in a recursive manner to generate responses to events, which then generate subsequent events and subsequent responses between the event manager modules and their event templates.

13 Claims, 11 Drawing Sheets

SYSTEM AND METHOD FOR UTILIZING EVENT TEMPLATES IN AN EVENT MANAGER TO EXECUTE APPLICATION SERVICES

FIELD OF THE INVENTION

The present invention relates to a system and method for running different business functions in a data processing system, where different instantiations of the event manager module utilize different event templates.

BACKGROUND

In many data processing systems today, computer communication networks are provided which allow for communications across a wide range of different computer systems. In many of these data processing systems the various different computers of the data processing system, and in some cases even applications running within the same computer will communicate with each other using an enterprise service bus, also referred to as ESB technology. In the enterprise service bus systems messages are sent through a common pathway, sometimes referred to as a bus, and these messages can be used to provide for communications between separate applications. However, in many instances there is no provision for sharing the communications among different processing platforms, and the bus generally requires a scheduler to assign priorities to schedule the flow of traffic through the bus. In these prior systems each application platform generally runs in a separate environment with dedicated services and is not integrated with applications running in other environments.

For example, in the context of a brokerage business many separate order entry applications can be used within a data processing system. Varied applications are used to open accounts, verify users, place and execute orders for different security types and so forth. Many of the basic operations used in such business function applications are the same across different system platforms. However, there is frequently no way for different platforms environments such as mainframe, UNIX and Windows platforms to share or re-use the same functions, or services across such platforms. Each application requires its own specific instructions, and code for each business function. Because of the platform dependencies, an experienced support team knowledgeable about each application and each platform is needed to fix problems for each application. If service utilities could be shared without requiring unique coding for a particular business function running on a particular platform, the cost of operating, training and maintaining these data processing systems could be greatly reduced by making the systems environment more simple and uniform.

DETAILED DESCRIPTION

Figure 1A:
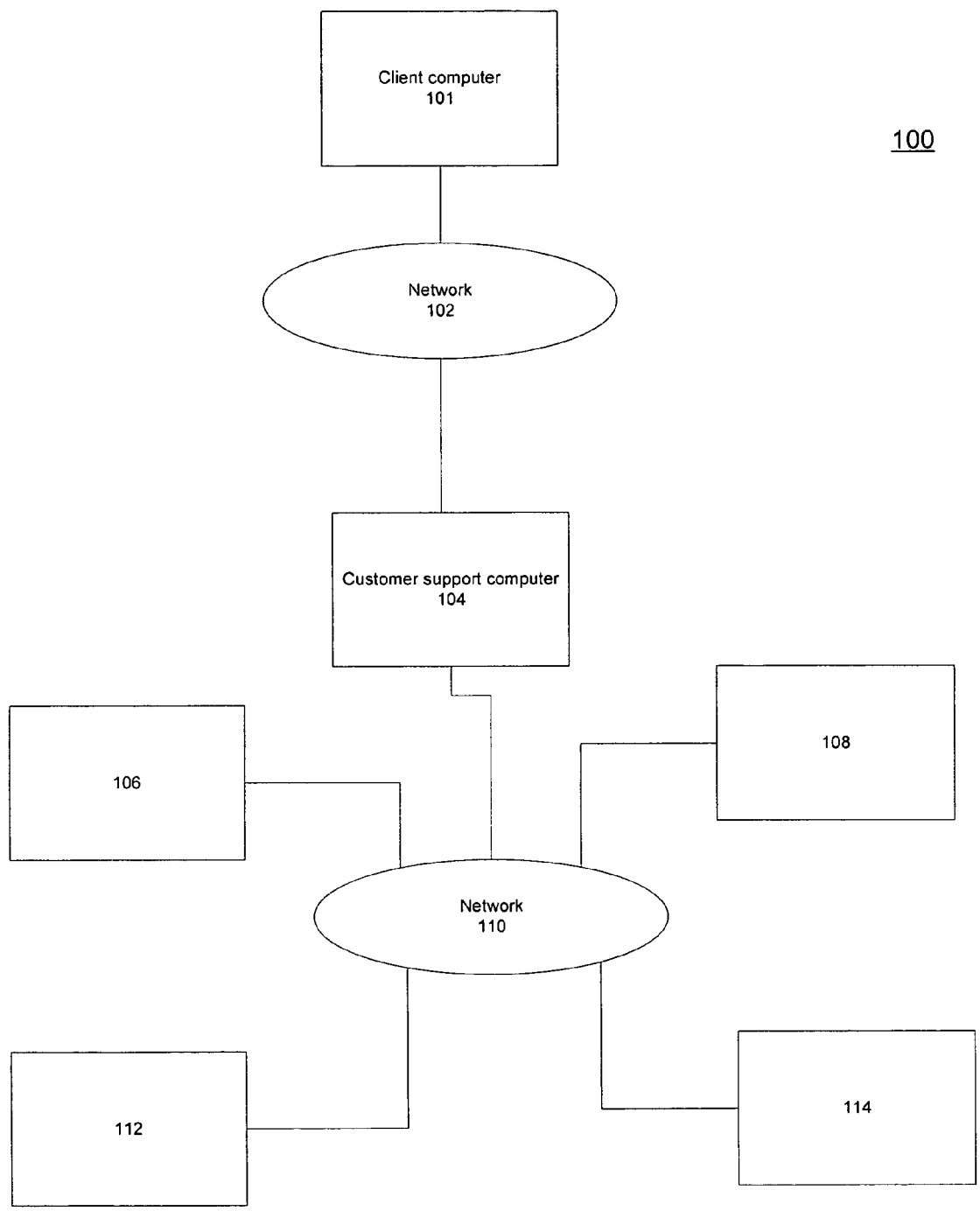
FIGS. 1A-1B shows aspects of an embodiment of data processing system of the present invention.

FIG. 1A shows an overview of a distributed processing system 100 which includes an embodiment of the invention herein. The system 100 includes a client computer 101. The client computer 101 can communicate with a customer support computer 104 through a communication network 102. The communication network could be a wide area network (WAN), or a local area network (LAN), or an open communication network such as the internet for example. A range of different communication methods and protocols, including for example HTTP can be used for the communications between the client computer and the customer support computer.

Figure 1B:
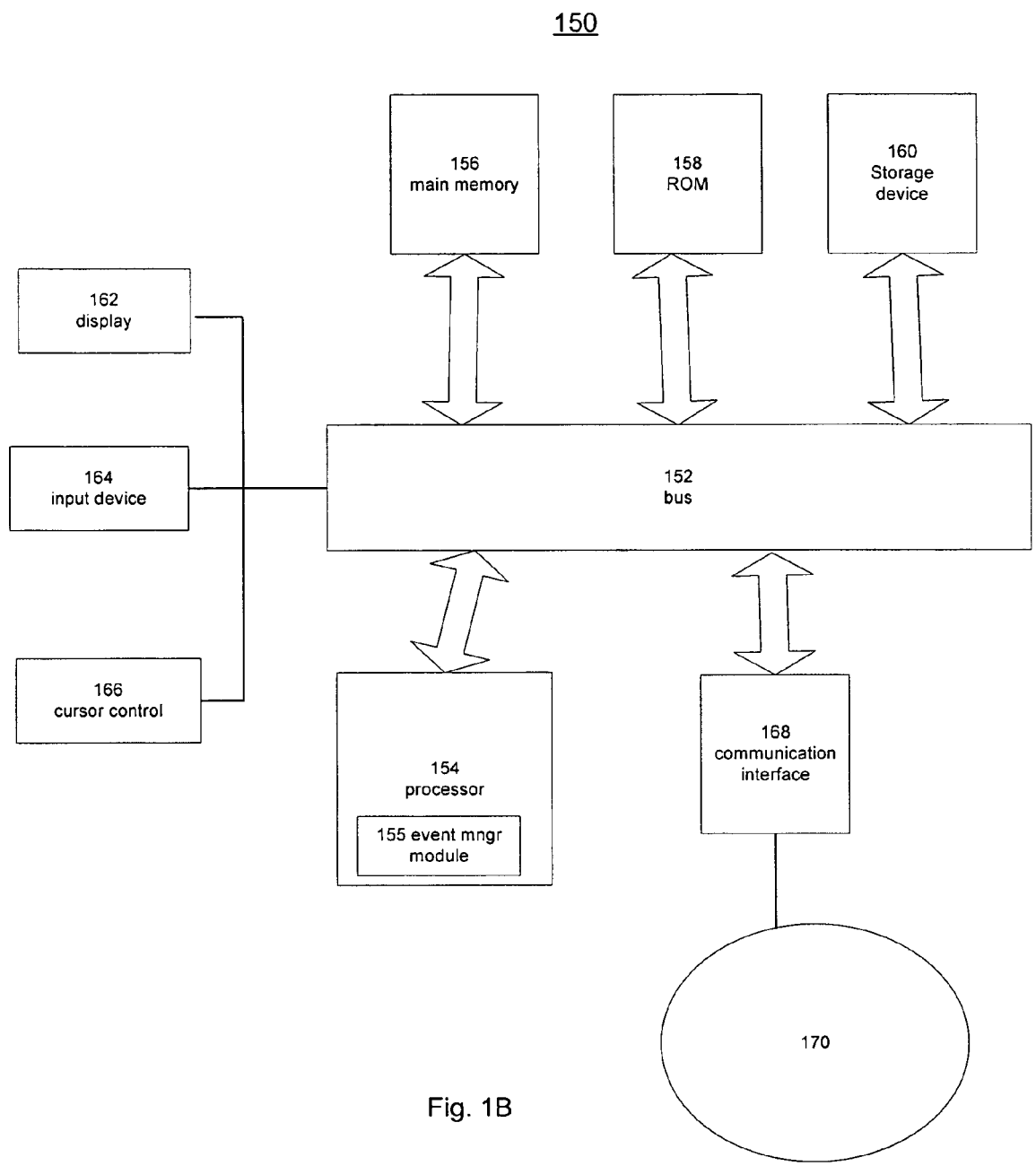

The customer support computer as well as many of the other computers in the system 100 can include a number of similar components, such as is shown in FIG. 1B. Indeed, it should be recognized that the system shown in FIG. 1B is a fairly generic description of a computer system which could be adapted and implemented in a number of different ways.

For purposes of general reference, FIG. 1B is provided to illustrate, among other things, the general configuration of a computer. Computer system 150 includes a bus 152 or other communication mechanism for communicating information, and a processor 154 coupled with bus 152 for processing information. In one embodiment this processor would be programmed to include an embodiment of an event management module 155, which operates to run a business function application. The event manager module 155 is described in greater detail below. Computer system 150 also includes a main memory 156, such as a random access memory (RAM) or other dynamic storage device, coupled to bus 152 for storing information and instructions to be executed by processor 154. Main memory 156 also may be used for storing temporary variables or other intermediate information during execution of instructions to be executed by processor 152. Computer system 150 further includes a read only memory (ROM) 158 or other static storage device coupled to bus 152 for storing static information and instructions for processor 154. A storage device 160, such as a magnetic disk or optical disk, is provided and coupled to bus 152 for storing information and instructions.

A display 162 can be coupled to the bus 152 displaying information to a computer user. Images shown on the display can be used to convey information to a user, and the user can interact with the information shown on the display to provide information to the computer 150, and other elements which can be connected to the computer 150. An input device 164, including alphanumeric and other keys, is coupled to bus 152 for communicating information and command selections to processor 154. Another type of user input device is cursor control 166, such as a mouse, a trackball, or cursor direction keys for communicating direction information and command selections to processor 154 and for controlling cursor movement on display 162. Computer system 150 also includes a communication interface 168 coupled to bus 152. Communication interface 168 can provide a two-way data communication coupling to the network 170.

One or more processors in a multi-processing arrangement may also be employed to execute the sequences of instructions contained in main memory 156. In alternative embodiments, hard-wired circuitry may be used in place of, or in combination with, software instructions to implement the invention.

Some aspects of embodiments of the invention discussed herein relate to use of multiple computer systems coupled together through a distributed computer network, or networks. In general the client computers can be any of a range of different types of personal computers; one embodiment described herein contemplates a client computer being a personal computer (pc) using a Pentium type or equivalent processor, and the client computer being loaded with the Windows operating system from Microsoft, and loaded with a browser application. A browser is an interactive program loaded on the client computer which allows a user to select and view documents (such as HTML) and access files and software related to those documents at different addresses or URLs. Browsers can utilize hyperlinks, which allow users to point and click with a mouse in order to jump from document to document in whatever order they desire. Browser operations can sometimes include executing small programs, such as Java applets or ActiveX controls included by programmers in the documents. Helper applications or plug-ins are required by some Web browsers to accomplish one or more of these tasks.

The discussion herein also contemplates use of servers. The servers are computers which generally include the elements described above in connection with FIG. 1B. The processor of a server can programmed to provide for communications and operations in accordance HTTP procedures, or other communication protocols. The server can also be loaded with applications which provide for performing different operations, and presenting pages generated by these applications to users of client computers through a browser. The server can also transmit other information, files and scripts (software code) to client computers. Servers are frequently used on both internet sites and company, or enterprise, intranets. Generally the servers can utilize a UNIX or Linux type of operating system, but other operating systems could also be used.

A mainframe computer generally includes the components discussed above in connection with FIG. 1B, however, a mainframe computer can in some situations be a more powerful and complex computer then some servers or client computers. A mainframe computer in the past might have been programmed with the MVS operating system from IBM, newer mainframe operating systems can include zOS from IBM. One more recent mainframe model available from IBM is the Z990 mainframe computer. The mainframe computer can include multiple processors working in parallel to speed processing of information, and can typically support a large number of users, or operations occurring nearly simultaneously.

In many embodiments the customer support computer 104 could be a web server computer, and it could receive input from numerous different client computers and other information input sources. In one embodiment the customer support computer will include a number of different applications and can run in response to communications from the client computer 101.

In most instances an operating system will be provided which controls numerous fundamental operations of the processor. In general the operating system runs on processor and is used to coordinate and provide control of various components within the computer. An object oriented programming system such as Java may run in conjunction with the operating system and provides calls to the operating system from Java programs or applications being executed in the computer processor. "Java" is a trademark of Sun Microsystems, Inc. Object oriented programming is widely know, and it will be understood that such languages generally provide for the generation of specific objects from a given class of objects. In one embodiment herein the Java language is used in implementation of the some of the elements of an event manager module, but it should be understood that any of a wide range of different programming languages, or programming techniques could be used to implement aspects of the invention herein. In general object oriented programming languages incorporate objects that are self-contained collections of computational procedures and data structures. Programs can be written by assembling sets of these predefined objects in far less time than is possible using conventional procedural languages The customer support computer 104 of FIG. 1A, can communicate with other computers within the processing system 100 via another communication network 110. In the context of a brokerage business data processing system, the other computers could include for example an information support computer 106, a custody support computer 112, a brokerage support computer 114, and technical support computer 108. These different computers 106, 108, 112 and 114, can be networks of additional computes, or single computers, and these computer can provide an array of different service utilities and applications and operations. These different computers can be coupled to each other by a communication network 110, which could be for example a LAN, WAN, or possibly an open communication network such as the internet. Additionally, these different computers can utilize different processing platforms such as Windows, mainframe systems, or UNIX. The event manager modules described in detail below can be utilized through out the different platforms to allow for communications and operations between each of the different platforms.

Figure 2:
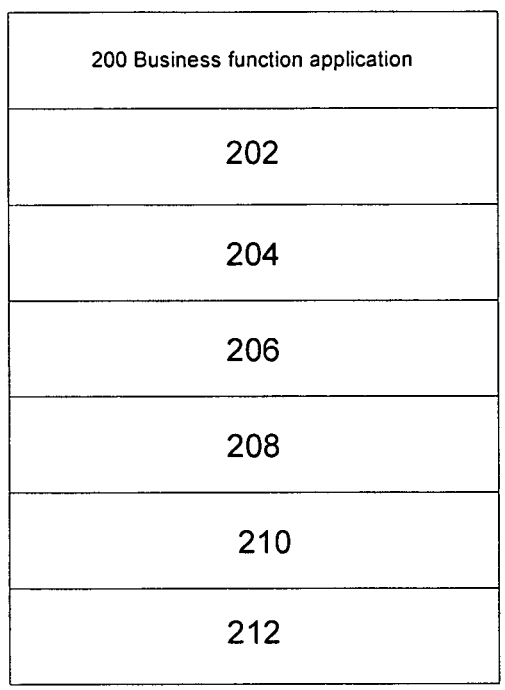
FIG. 2 illustrates service elements of a business function application.

FIG. 2 shows different processes of a business function application 200. A business function application is a process which requires the implementation on one or more operations to achieve a required result for the business operation. For example, in the context of a data processing system implemented by a brokerage business, a business function application could be providing a real-time account balance in response a customer inquiry. The desired result of providing the business function application would be presenting the customer with an identification of all of the customer accounts, and total value for all of the accounts. In a present embodiment of the invention, herein, the business function application would be broken into a number of discreet operations, or discreet collections of operations, referred to herein as service elements. In one embodiment, each of these service elements would correspond to a specific operation, or collection of operations, which can be performed by a service utility of the system. A service utility can be a collection of software instructions which are being run by a processor of one of the computers within the data processing system. The service utility can be commonly available to provide the operations of the service utility to different business function applications being implemented in the data processing system.

In the embodiment of FIG. 2, the business function application 200 provides a result of providing the customer with a webpage which shows the customer account balance information. Some exemplary service elements 202 through 212 are then identified as being operations which need to be performed to achieve the desired result of the business function application. Service element 202 corresponds to the operation of identifying all of the customer's brokerage accounts which are held by the brokerage company. Service element 204 corresponds to identifying the most recent ascertainable values for assets held in the brokerage accounts. Service element 206 corresponds to determining if there are any customer brokerage accounts with associated banking accounts. Service element 208 corresponds to using a transmission protocol such as FTP or other known information transfer, or file sharing method, to obtain banking account information, where a banking account is associated with a customer brokerage account. Service element 210 corresponds to a formatting operation which builds a customer account webpage for a customer to present the customer account information to the customer. Service element 212 corresponds to an encryption operation which operates to encrypt the customer account webpage prior to transmission of the webpage to the customer through the internet. It should be noted that the above operations and service elements are provided for illustrative purposes. One of skill in the art will recognize that these elements could be broken down in to a wide range of additional service elements, or certain service elements might be consolidated into groups of operations.

Figure 3:
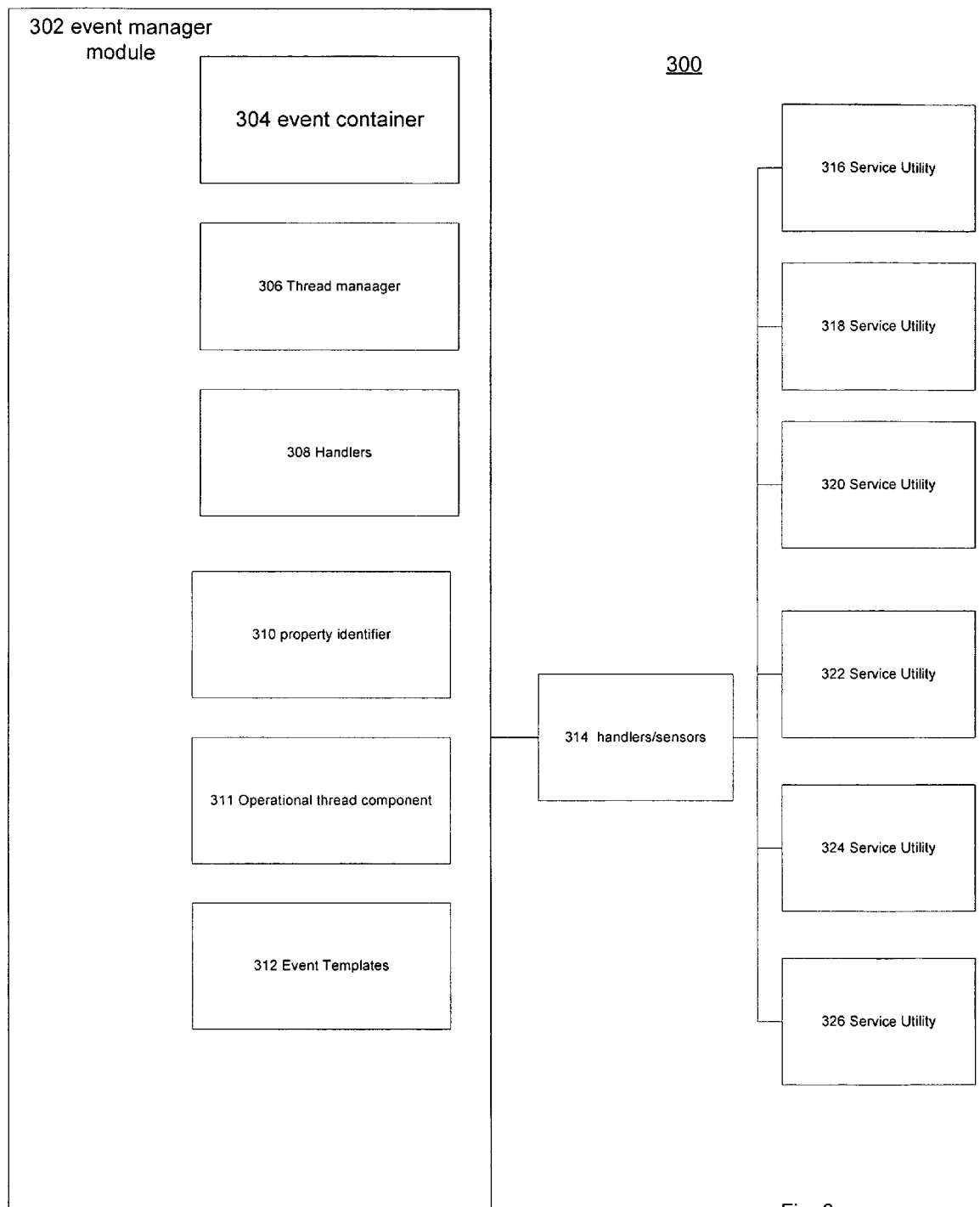
FIG. 3 illustrates an embodiment of a system herein.

FIG. 3 illustrates elements of a system 300 of an embodiment of the invention herein. In one embodiment the event manager module 302 is a software application which is instantiated in the processor of a customer support computer. However, various different instantiations of event manager modules could be running on different processors within the system. As will be discussed in more detail below, the elements of the event manager module, are such that the event manager module can be used to implement a very broad range of different business function application. The basic structure of the event manager module can remain unchanged, but the underlying properties, and operations, of the event manager module are easily adapted such that it can be utilized in a wide range of different computer systems, and it can be used to provide for a wide range of different functions, and to implement different business function applications.

It should be understood that the components and modules described in connection with the event manager module 302 correspond to sets of software instructions which run in the processor of the computer which is executing the instructions of the software program. The methods or actions taken by the processor in accordance with the various instructions are described in detail herein.

One element of the event manager module 302 is the property identifier component 310. The property identifier component operates such that when the event manager module is instantiated in the processor for runtime operation, the property identifier component will communicate with the operating system of the computer to identify operational properties, and resources of the computer system environment, such as identifying the type or processor in which the event manager module is running, the different input/output ports which may input data or receive data from the event manager module. The event handler module 302 can also include an operational thread component, or initializer, 311 which operates to initiate operational threads, where these threads are part of the general management operation of the event manager module. In general a thread corresponds to sequence of operations executed in a processor, and multiple threads can generally operate simultaneously, and share resources.

In one embodiment the operational threads can operate to set up communications of different ports of the event manager module, initiate the reading of shared data storage space (one widely used shared storage space approach which is utilized for sharing information is a network attached storage system, also referred to as NAS) and/or initiate the receiving and reading of information received through a message queuing system.

In one embodiment, given that the event manager module 302 includes a property identifier component, the event manager module can be run on wide range of different computer systems, and the event manager module will operate to read and ascertain the attributes of the system it is running in, and the resources available to it, at the start up, instantiation, of the event manager module in the processor.

Another component of the event manager module 302 is an event container component 304. In one embodiment the event component container operates to store a record of various events, or signals, that have occurred in the computer system that are relevant to the running of the business function application which is being processed by the event manager module 302. The specific implementation of the event container component can be achieved in a number of different ways. However, in one embodiment, the basic operation of the event container component will provide for storing some record of events which have occurred in the system that are relevant to the running of the business function application being managed by the event manager module, and, additionally, the event container can also include information either directly, or indirectly, identifying event handler components which are to be utilized to invoke a service utility in response to some event.

The event templates component 312 includes a number of event templates. In one embodiment of the system herein an event template is provided for each of the service elements of the business function application which is being run by the event manager module 302. For example where an event manager module 302 is being used to run the business function application 200 from FIG. 2, the event templates component 312 would include 6 event templates, where an event template is provided for each of the 6 service elements described above in connection with FIG. 2.

Figure 4:
FIG. 4 shows an embodiment of an event template of the present invention.

FIG. 4 shows basic components of an embodiment of an event template 400. An embodiment of the event template 400 includes an identifier component 402. The identifier component operates to identify an event which corresponds to the particular event template 400. In one embodiment of the system when a sensor of the event manager module recognizes an event, it will refer to the identifier component 402 of the event templates to identify the event template which corresponds to the recognized, or sensed, event. Once the corresponding event template has been identified, the event information can be passed to the event template. The event template 400 will then review the dependencies components 408 to determine if all dependency conditions have been met. These dependency components can include making a determination of whether various signal or triggering events have occurred, and can also include determining if various scheduling criteria has been met. If all dependency conditions have been met, then the event template 400, and event handler component identifier 404 of the event template 400 will operate to identify an event handler which should be used to invoke a corresponding service utility. This invoking of the service utility could include for example establishing a communication channel with the service utility whereby necessary information, if any, is passed to the service utility, and the service utility in response to a command or instruction, initiates its operations, to provide for the functions required by the service element. The event template 400 can also include template specific processes 406, which can provide for performing specific functions which are unique to the particular template.

In one embodiment after the necessary dependencies have been meet, the event template will operate to provide event information to the event container component 304 of the event manager module. Additionally, the event manager module can operate to identify the event handler component which should be used to invoke the corresponding service utility.

The event manager module can include a number of specific event handler components 308, which could be for example incorporated directly in the instructions of the event manager module, or the event manager module can operate to select from a wide range of different classes of event handlers which could be provided for in the system, and exist as set of stand alone components 314. For example, the Java software language provides for a wide range of different classes of event handlers, and sensors, 314 which can be used to make calls and perform different functions.

Additionally, in the embodiment of the system 300 of FIG. 3, the event manager module could receive an indication from one of the event templates that a particular event handler should be used to initiate or invoke the operations of one of the service utilities 316-326 to perform some specific operation, or series of operations. In response to such an indication the event manager module could directly invoke the designated event handler, or alternatively it might place the indication, and information from the corresponding event, into the event container component 304 for subsequent processing, after the particular indication, or event has reached a sufficient priority in a queue of the event container. The event manager module 302 can also include a thread manager component 306 which operates to manage various threads of the operation of the event manager module. This component 306 can be very helpful in situations where multiple event handler components have been used to invoke multiple service utilities, where multiple threads are providing for communication with the operations of the various service utility operations.

Figure 5:
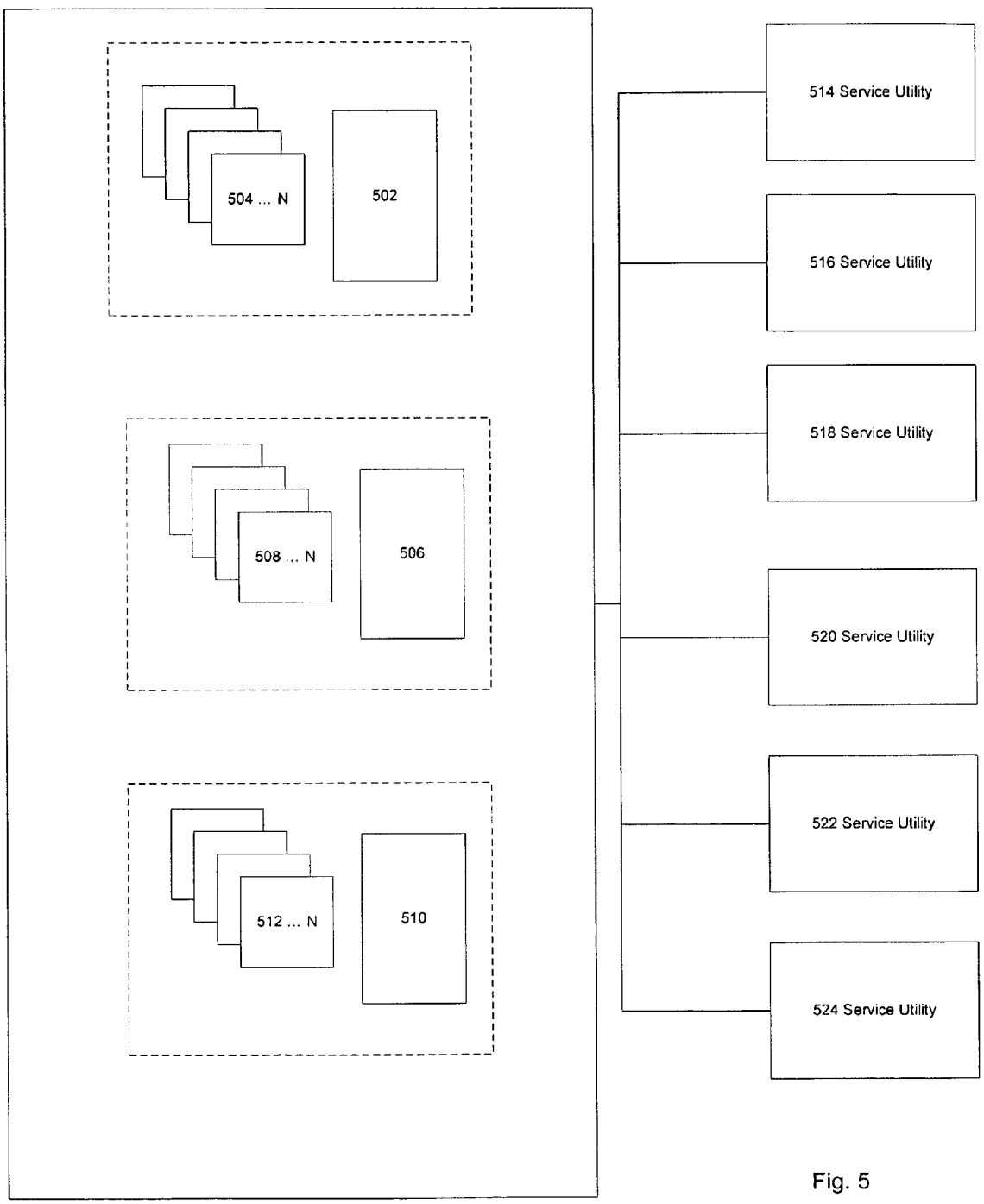
FIG. 5 shows an embodiment of system of the invention herein.

FIG. 5 illustrates an embodiment of a system 500 of the invention herein. FIG. 5 shows a situation where 3 different business function applications are being run in a processor in a computer of a data processing system. The first business function application is being run by the event manager module 502. The second business function application is being run by the event manager module 506, and the third business function application is being run by the event manager module 508. The basic elements of each of the event manager modules 502, 506 and 508 can essentially be the same, with components such as an event container, a thread manager, event handler components, and a property identifier. However, each of the event manager modules 502, 506 and 508 will utilize a unique combination of event templates, with event manager module 502 utilizing event templates of 504 . . . N, event manager module 506 including event templates 508 . . . N, and event manager module 510 using event templates 512 . . . N.

The basic structure of each of the event templates is the same, but the functionality and specific dependencies for each of the event templates is determined by the service elements of the business function application which is being run by the corresponding the event manager module.

In accordance with specific event handler indications from the event templates, the event manager modules will operate to make calls to invoke the various service utilities 514-524 which are available in the system 500. The service utilities could reside on computers which are remote to the computer on which the event manager modules are running, but could be accessed through a data communication network. Indeed the service utilities can be operating in different domains and or on different platforms then the event manager modules which are invoking them. In one embodiment of the system 500, when a new business function application is to be added for implementation in the data processing system, the development of the new specific software code necessary to implement the new business function application of the system can be minimized by utilizing the structure described in FIG. 5. Specifically, the starting point for developing the software for the specific business function application could start with identifying all the service elements of the new business function, and then adding event templates in an event manager module, where the event templates correspond to the specific service elements of the new business application function, and the specific service elements have corresponding operations which are to be performed in response to the occurrence of particular events, which can be referred to as trigger events.

The event templates will then determine when necessary dependencies have occurred prior to the initiation of the operation of the corresponding service utility for providing the function which corresponds to the service element. Thus, this system of an embodiment of the invention herein then provides for an operation where new business function applications can be added with minimal new coding, as each new business function application can utilize the same basic event manager module structure, and service utilities. In addition, in some instances the new business function application, could utilize event templates which have already been developed for previously implemented business function applications. It should also be recognized that in some circumstances a new business function application might require the development of one or more new service utilities. When a new service utility must be developed in order to implement some business element of a new business function application, then the attributes and characteristics of the new service utility should be recorded and cataloged so that it will be accessible for use for any other business function application which might include the same type of service element and which would require use of the same type of service utility operation.

Figure 6A:
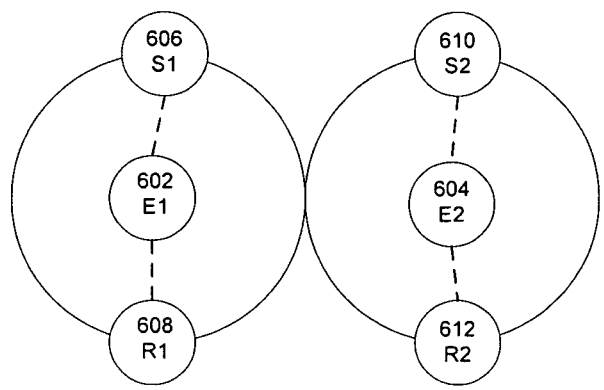
FIGS. 6A-6B illustrates embodiments of a communication method according to a method of the present invention.
Figure 6B:
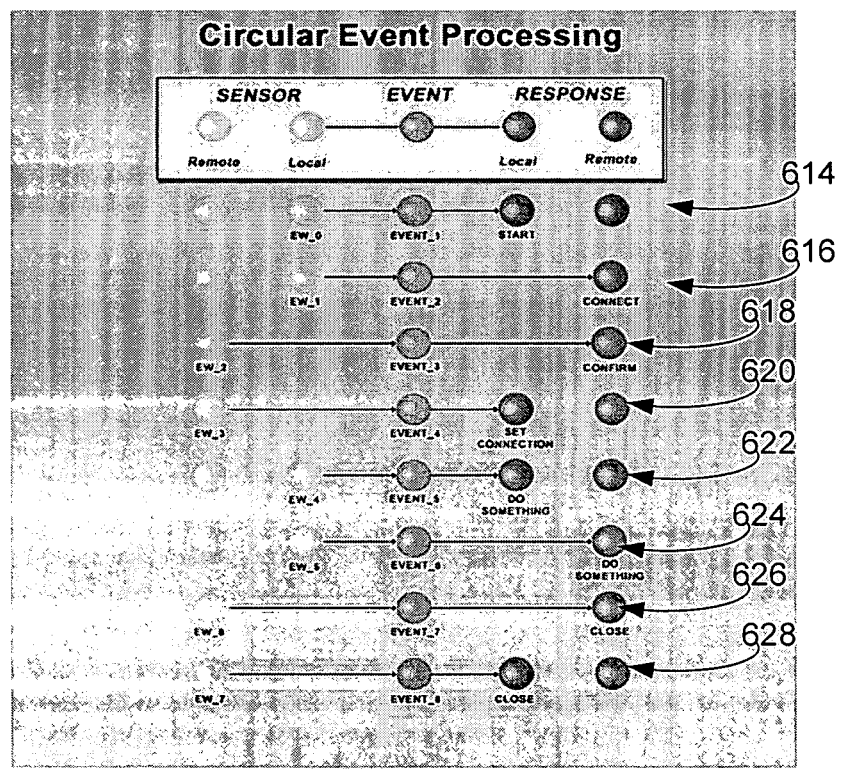

FIGS. 6A-6B illustrate aspects of the operation of a method of the invention herein. FIG. 6A shows an element 602 E1, which represents a first event template which is part of an instantiation of one embodiment of an event manager module, and element 604 E2 represents a second event template which is another part of an instantiation of the embodiment of an event manager module. The event manager module would include a number of sensor objects such as 606 and 610. When the event manager object senses an event S1, the event manager module will then identify the event template which corresponds to the sensed event, which in this case would be the event template 602 E1. This event template will operate to determine if all dependencies are met, and if the dependencies are met then the event template 602 E1 will indicate that some handler, as specified by the event template 602 should be used to generate some response to the occurrence of the event 606 S1. For example, the event template could call for the utilization of an event handler to invoke a particular service utility, where the event has been sensed at S1, and when the corresponding dependencies have occurred. After the service utility has been invoked the service utility will typically provide some response. As shown in FIG. 6A this response would be the 608 R1.

The event manager module may then sense a second type of event 610 S2 which would then lead to a response 612 R2 as determined the actions of the event template 604 E2. Note that each of the event templates could utilize some of the same resources and portions of software code as other event templates of the event manager module. Indeed, somewhat circular or recursive operations could occur where an event template operates to indirectly initiate the running of a service utility which in turn generates an event which is sensed by the event manager module which then would call the same event template a second time, or the received event might result in a second event template of the same event manager module being used.

It should also be noted that the while the above discussion regarding FIG. 6A contemplates the event templates 602 and 604 being part of the same event manager module, these event templates could also be parts of different event manager modules, and these different event templates could be generating events whereby one of event templates in effect generate calls, to another event templates, or otherwise generates an event which is directed to an event template in a different event manager module.

The elements of FIG. 6A can also used to illustrate a potential event flow where initially at 606 S1 an event is sensed. The event is then passed to the event template 602E1 which operates to make a determination to use an event handler to initiate the operation of a service utility. The operation of the service utility then provides for some responding signal or event 608 R1. In one embodiment the responding event 608 R1 could then be received as an event 610 S2. The event 610 S2 is then passed to event template 604 E2 which then operates to initiate the operation of another service utility, and this service utility can then provide a responding event 612 R2. This responding event 612 R2 can then be received as an event 606 S1 and the process can repeat itself until some conclusion is reached.

FIG. 6B illustrates an aspect of event processing flow according to an embodiment of system and method of the present invention. The processing flow shown in FIG. 6 B, shows a circular event processing operation, in that the processing of an event, and the subsequent generation of a response to an event will create another event which can be processed by an event template of the same event manager module which processed the initial event.

At step 614 of FIG. 6B, an initial event EW_0 is sensed by a sensor object of the event manager module. This initial sensing corresponds to an indication that the business function application corresponding the event manager module should begin running. Upon receipt of the event EW_0 the event manager module will utilize the event template corresponding to the event EW_0 and this event template will initiate a call to a handler to start operation of the particular business function application. This initial start event will then result in generation of a local event EW_1 which will then be passed 616 to event template Event_1 which generates a call to a handler for making a connection with some remote resource such as a service utility. The making of this of this connection then generates a remote event EW_2 which could be generated by a service utility, the event EW_2 is passed 618 to event template Event_3 which then results in a remote confirmation response. The confirm event is then remotely sensed as event EW_3 and this event is then passed 620 on to the corresponding event template Event_4, and the process continues, with the passing 622-626 of events to corresponding event templates until the event EW_7 is remotely sensed and passed 628 to event template E 8, and the Event 8 template operates to the close that particular running of the corresponding business function application.

Figure 7:
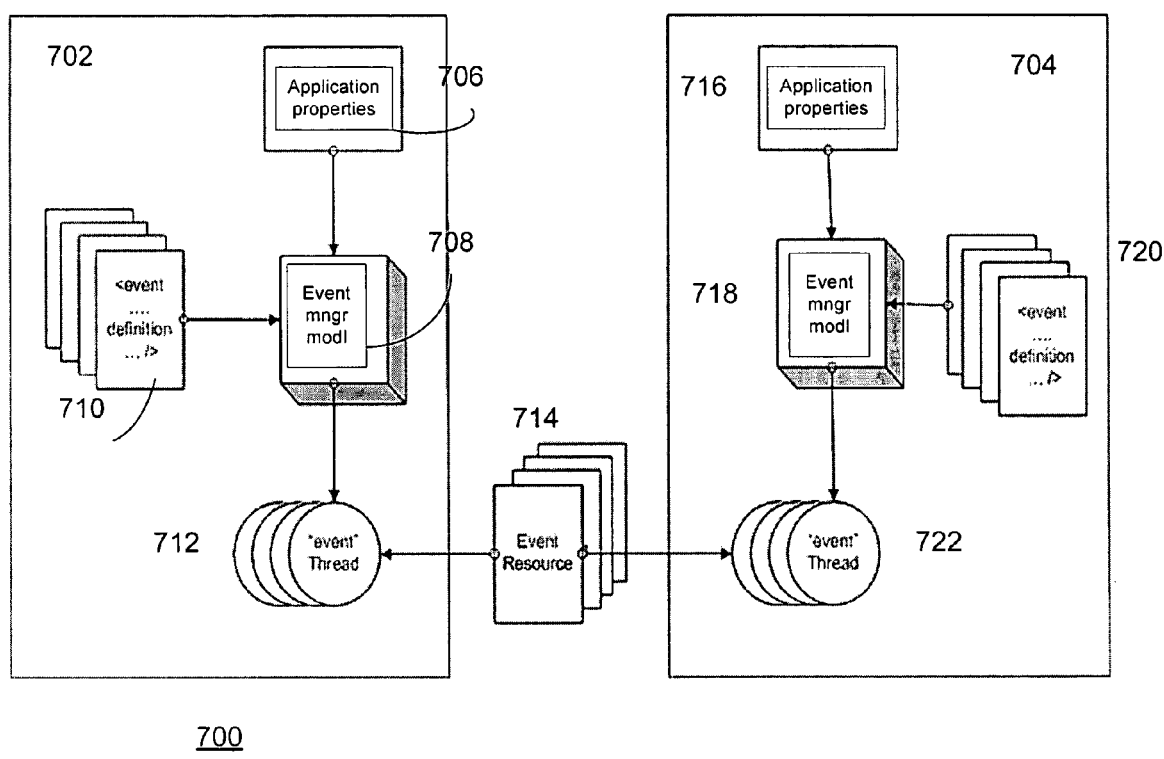
FIG. 7 shows an embodiment of a system of the present invention.

FIG. 7 illustrates an embodiment of a system 700 of an aspect of the invention herein. The system 700 illustrates an embodiment where a first instantiation of an event manger module 708 is provided on one computer system 702 which is part of a data processing network, and a second instantiation of an event manager module is provided on another computer 704 of the data processing network. The event manager module 708 includes numerous event templates 710 which correspond to the various service elements of the business function application which is run by the event manager module 708. These event templates operate to receive and identify parameters for various events which are received, and thereby provide event definitions. The event manager module operations or processes are determined in part by the application properties 706, which can include the properties and resources of the system in which the event manager module is running.

When an event is received by the event manager module 708, the event templates 710 operate to determine if the dependency conditions have occurred and if so then, an event handler is used to initiate a processing thread 712 which provides event information and event parameters to an invoked service utility of the system, and the service utility operates perform its corresponding actions, and these actions provide the functions which correspond to a particular service element of the business application function, which is being run by the event manager module 708.

The communications between the event manager module to the service utilities 714, which could also be thought of as event resources, in that the service utilities provide for operations to be undertaken in response to particular events, could be achieved in a number of different ways depending on the system configuration. For example, one or more of the service utilities could be implemented as different sets of software instructions, or hard wire coding which is provided for the same computer which is running the event manager module 708. Additionally, other service utilities could be implemented on other computers which are connected via a network to the computer on which the event manager module is running. In the above discussion the computer 704 contains an event manager module 718, with event templates 720, and application properties 716, and event threads 722, which operate in manner similar to the operation described above in connection with the elements of the computer system 702 above. The event manager module 708 can utilize different combinations of the service utilities 714 to provide the necessary functions for the business function application that it is running. However, the specific properties and operations of the various elements would vary according the service elements of the particular business function application being run by the event manager module 718. Additionally, the various service utilities 714 can be running on different platforms then the event manager module 702 and 708.

In initiating the operation of service utilities, the event templates can identify the same event handler to be used for invoking a particular service utility. However, even though the same service utility is being used, and the same event handler is being used to invoke the service utility, the event templates can provide further contextual information which specifies specific properties, and attributes which the event handler should include, and these specific properties and attributes, can allow different event manager modules, or event templates within the event manager modules, to use the service utility in one situation, for example in response to a first type of event, to provide for a first type of result, and then in a second situation in response to a second type of a event, the same service utility could be invoked using the same event handler, but with different attributes and properties, such that the service utility can operate to provide a second result which is different than the first result. For example, if the service utility were a FTP (file transfer) utility, in one situation the FTP might obtain a first file from a first storage location and then provide some encryption of the file and then store the encrypted file at a second location. In a second situation the same FTP could be used to retrieve a second file and then to store the second file in at different location without encryption. Thus, the event templates can be used to supply contextual information to be used in connection with an event handler, and the contextual information can then control certain aspects of the operation service utility which is invoked by the event handler.

One aspect of an embodiment of the invention herein is that when a new business function application is being developed for implementation in a data processing system, the new business function can in some situations be implemented without making any changes to the software code of the existing service utilities. This can be a very beneficial aspect of an embodiment of the invention. In large data processing systems it can be the case seemingly minor changes to existing services will cause unexpected, and sometimes detrimental results. In an embodiment of the present invention, the event templates are used to identify service utilities to be used in connection with performing functions for a service element of business function application. The specific contextual information for the invocation of the service utility can passed either directly, or indirectly, from the event templates. The contextual information, can include various argument, attributes, properties, and possibly other parameters, and this information can be used to modify the operation of a service utility, without requiring a modification of the code of the underlying service utility itself. Thus, with respect to other applications using the service utility, the operation of the service utility will remain unchanged.

Below under the heading of Example A is an illustrative embodiment of software code for one particular event template which is shown for illustrative purposes. It should be noted that the specific code and structure of the event template could be implemented in a variety of different ways, but it is constructive to provide some illustration of a possible implementation. The code shown below in Example A is an embodiment of an event template code written in XML (Extensible Markup Language), but other software languages could be used. XML is a meta-language—a language for describing other languages_which lets users design their own markup languages for limitless different types of documents.

Example A

```
<EVENT name="PHX_PMCTR">
<TYPE>com.cmd.services.INBOUND_H00001</TYPE>
<PROCESS param="PMCTR.TXT">/apps/NDM/inbound/rpa/ctrph/
</PROCESS>
<PORT ch="2400" lock="000">PHX_PMCTR</PORT>
<WAIT duration="0">no_response</WAIT>
<ACTION command="/apps/RC/bin/AScommands/PRJCDCT5 ">_
</ACTION>
<ARGUMENT>/apps/NDM/inbound/rpa/ctrph/,PHX_PMCTR,
PHX_PMCTR,0,0,/apps/NDM/inbound/rpa/ctrph/</ARGUMENT>
<ALT_0>EXIT</ALT_0>
<ALT_1>ALERT,HOLD</ALT_1>
<RUN_DAYS>mon,tue,wed,thu,fri</RUN_DAYS>
<HOL_CALENDAR>SCH_2006</HOL_CALENDAR>
<START_DATE>01/01/2006</START_DATE>
<END_DATE>12/31/2010</END_DATE>
```

-continued

```
<START_TIME>09:00:00</START_TIME>
<STOP_TIME>15:30:00</STOP_TIME>
<RUN_TIME>1440</RUN_TIME>
<EXECUTE_EVERY>10M</EXECUTE_EVERY>
<DEPENDENCE name="PHX_PMCTR">
<RESOURCE type="file">/apps/NDM/shared/s1408cdc/work/
cmd_rc/signal/do.main.null</RESOURCE>
<RESOURCE type="file">/apps/NDM/shared/s1408cdc/
work/cmd_rc/signal/ws.ctr.null</RESOURCE>
<RESOURCE type="fileFilter">/apps/NDM/inbound/rpa/
ctrph/,PMCTR.TXT</RESOURCE>
</DEPENDENCE>
<DISPLAY_MONITOR>NO</DISPLAY_MONITOR>
</EVENT>
```

The above event template code operates, such that a processor programmed with this code would invoke a utility service which executes a shell script PRJCDCT5. The first line of code identifies a name of the event, which in this case would be PHX_PMCTR. The second line of the code above, with the tag <Type> identifies the event handler type to be utilized to initiate the initiate the event handler thread, in response to the receiving the event PHX_PMCTR, assuming that other necessary dependencies have been met. In the example shown above the code "com.cmd.services.IN-BOUND_H00001" specifies a path for the handler class or type which is used to initiate an event thread which could include the running of a utility service which corresponds to one of the service utilities of the system. The lines with the tags <PROCESS>, <PORT>, <WAIT>, <ACTION>, <ARGUMENT>, <ALT_0> and <ALT_1> are parameters, where these can in whole, or in part, be parameters received with the event PHX_PMCTR and can be considered to be part of the event. The event itself can provide specific information for each of these parameters in connection with the received event. The event handler will then use these parameters when the handler invokes or calls the service utility to perform the functions required by the service elements. These parameters can be used as attributes and arguments when the event handler invokes the service utility.

The lines of code <RUN_DAYS>, <HOL_CALENDAR>, <START_DATE>, <END_DATE>, <START_TIME>, <RUN_TIME><EXECUTE_EVERY>, operate to specify the timing and frequency for which the event handler will be run to initiate the event thread corresponding to "com.cmd-.services.INBOUND_H00001" This section of code operates as a runtime scheduler which determines the timing and frequency of generating the corresponding event thread. It is worth noting many embodiments of the event templates would not be run on periodic type of basis, and thus may not require such a scheduling component.

The lines of code with the tags <DEPENDENCE><RESOURCE> define different dependency conditions, or events which must occur prior to invocation of the event thread called for by the event template, which in this case would correspond to "com.cmd.services.IN-BOUND_H00001".

The text below under the heading Example B below shows XML code for another embodiment of an event template which operates to execute a ftp (file transfer) from an external computer system, which in this case could be a computer system which is external to the data procession system 100 shown in FIG. 1, and could be accessed via the internet, or other communication network, and to send an email to a particular the email address, if certain events, or errors, occur during the file transfer process. The event template illustrated in Example B below includes the same general structure and elements as were described above in connection with the event template code shown in Example A.

Example B

```
<EVENT name="FTPGET_EXTERNAL">
<TYPE>com.cmd.services.INBOUND_H00002</TYPE>
<PROCESS param="LIST_EXTERNAL">/apps/NDM/shared/s1408cdc/work/cmd_1/log/ftp/</PROCESS>
<PORT ch="0000" lock="/apps/NDM/shared/s1408cdc/work/cmd_1/log/ftp/Successful.LIST_EXTERNAL">/apps/NDM/inbound/ftp/</PORT>
<WAIT duration="0">no_response</WAIT>
<ACTION command="ftpList">xxx@yyyyy.com</ACTION>
<ARGUMENT>ftpGetNas</ARGUMENT>
<ALT_0>exit</ALT_0>
<ALT_1>ALERT,NO_HOLD</ALT_1>
<RUN_DAYS>mon,tue,wed,thu,fri,sat</RUN_DAYS>
<HOL_CALENDAR>SCH_2006</HOL_CALENDAR>
<START_DATE>01/01/2006</START_DATE>
<END_DATE>12/31/2010</END_DATE>
<START_TIME>00:01:00</START_TIME>
<STOP_TIME>23:59:00</STOP_TIME>
<RUN_TIME>1440</RUN_TIME>
<EXECUTE_EVERY>5M</EXECUTE_EVERY>
<DEPENDENCE name="FTPGET_EXTERNAL ">
<RESOURCE type="file">/apps/NDM/shared/s1408cdc/work/cmd_1/signal/do.main.null</RESOURCE>
<RESOURCE type="file">/apps/NDM/shared/s1408cdc/work/cmd_1/signal/ws.inbound_FTPGET.null</RESOURCE>
<RESOURCE type="file">/NAS/EFT/External/tmp/PXCTD001.asnull</RESOURCE>
</DEPENDENCE>
<DISPLAY_MONITOR>NO</DISPLAY_MONITOR>
</EVENT>
```

The code shown below in Example C shows XML code which illustrates another embodiment of an event template. The event template corresponding to the code shown in Example C would operate to call a trade validation service utility every 10 seconds. The event template illustrated in Example C below includes the same general structure and elements as were described above in connection with the event template code shown in Examples A, and B above. However, the specific details of the elements are different, as the basic operation of the different event templates provide for responding to different events and provide for initiating different event threads.

Example C

```
<EVENT name="Trade_Validation">
<TYPE>com.cmd.services.TR_H00001</TYPE>
<PROCESS param="trade_validation">/apps/NDM/shared/s1408cdc/work/RC_Validation/port/</PROCESS>
<PORT ch="000010011" lock="ind_">/apps/NDM/shared/s1408cdc/work/RC_Validation/port/</PORT>
<WAIT duration="8M">SUCCESSFUL</WAIT>
<ACTION command="UNIX">com.cmd.services.TR_H00001</ACTION>
<ARGUMENT>STAR,com.schwab.star.rc.StarRCcommand,doValidation,</ARGUMENT>
<ALT_0>EXIT</ALT_0>
<ALT_1>ALERT</ALT_1>
<RUN_DAYS>mon,tue,wed,thu,fri,sat,sun</RUN_DAYS>
<HOL_CALENDAR>SCH_2006</HOL_CALENDAR>
<START_DATE>01/01/2006</START_DATE>
<END_DATE>12/31/2010</END_DATE>
<START_TIME>00:01:00</START_TIME>
<STOP_TIME>23:59:00</STOP_TIME>
```

-continued

```
<RUN_TIME>1440</RUN_TIME>
<EXECUTE_EVERY>10S</EXECUTE_EVERY>
<DISPLAY_MONITOR>NO</DISPLAY_MONITOR>
<DEPENDENCE name="Trade_Validation">
<RESOURCE type="file">/apps/NDM/shared/s1408cdc/work/cmd_rc/signal/do.main.null</RESOURCE>
<RESOURCE type="file">/apps/NDM/shared/s1408cdc/work/cmd_rc/signal/do.trade_validation</RESOURCE>
</DEPENDENCE>
</EVENT>
```

The code shown below in Example D illustrates XML code for another embodiment of an event template; this embodiment would provide an event handler which pings a second instance of the event manager module. The second instance of the event manager module called "cmd" could be running the same processor or a different processor, than the instance of the event manager module which initiates the ping. A ping can be the sending of an event object from one instance of the event manager module, to another instance of an event manager module, and the second event manager module could then send a response to the first event manager module which initially sent the ping. The line in example D below with the tag WAIT corresponds to waiting for three (3) minutes to determine if a response is successfully received in response to the ping. If a response is not received then an alert can be generated. The event template illustrated in Example D below also includes the same general structure and elements as were described above in connection with the event template code shown discussed above. However, the specific details of the elements are different, as the basic operation of the different event templates provide for responding to different events and provide for initiating different event threads.

Example D

```
<EVENT name="cmd">
<TYPE>com.cmd.services.Ping_RC_CMD</TYPE>
<PROCESS param="cmdProcess.Buffer">/apps/NDM/shared/s1408cdc/work/cmd/port/</PROCESS>
<PORT ch="000010011" lock="ind_">/apps/NDM/shared/s1408cdc/work/cmd/port/</PORT>
<WAIT duration="3M">SUCCESSFUL</WAIT>
<ACTION command="4001">com.cmd.services.IN_H00001</ACTION>
<ARGUMENT>ping cmd</ARGUMENT>
<ALT_0>EXIT</ALT_0>
<ALT_1>ALERT</ALT_1>
<RUN_DAYS>mon,tue,wed,thu,fri,sat,sun</RUN_DAYS>
<HOL_CALENDAR>SCH_2006</HOL_CALENDAR>
<START_DATE>01/01/2006</START_DATE>
<END_DATE>12/31/2010</END_DATE>
<START_TIME>00:10:00</START_TIME>
<STOP_TIME>23:50:00</STOP_TIME>
<RUN_TIME>1440</RUN_TIME>
<EXECUTE_EVERY>15M</EXECUTE_EVERY>
<DISPLAY_MONITOR>NO</DISPLAY_MONITOR>
<DEPENDENCE name="cmd">
<RESOURCE type="file">/apps/NDM/shared/s1408cdc/work/cmd_rc/signal/do.main.null</RESOURCE>
<RESOURCE type="file">/apps/NDM/shared/s1408cdc/work/cmd_rc/signal/do.ping</RESOURCE>
</DEPENDENCE>
</EVENT>
```

In one embodiment, the event manager module will include a number of other components in addition to event templates. Many of these additional elements have been discussed in detail above. Additionally, provided herein for illustrative purposes are portions of JAVA code which could be used in an embodiment of the invention herein to provide for other components of the event manager module.

The code shown below under the heading Example E corresponds to a property component identifier of an event manager module. The code below under Example E also includes additional elements which operate to start operational threads of the event manager module. These operational threads provide for basic operations and management of the event manager module, where the event manager module will operate to access and implement the actions provided for in the event templates. These operational threads, not all of which are shown in the code of Example E, could include providing for a periodic instruction generation, which triggers some repetitive action. This periodic instruction component, is sometimes referred to as a heartbeat. For example, the event manager will operate to periodically read events and put events into a container component, the event manager module will operate to periodically read events in the container component, and then to periodically use event handlers to invoke various service utilities based on the content of container module. The different operational threads of the event manager module, can also include for example, monitoring information on specified inbound ports, monitoring one or more schedulers which set schedules for performing specified tasks. Additionally, in some embodiments the event manager module will operate to provide a web server type interface. This type of interface, can be very helpful to allow an administrator to view the operation of a particular event manager module operating in the system. The property identifier component of Example E, provides a determining if such a web server element is provided for, and if so starting the operation of the web server element.

Example E

```
try {
readInstance( );
Logger.debug(Logger.MIN_DEBUG, "*** starting main startUp( ) ***");
} catch (Exception e){
Logger.debug(Logger.MIN_DEBUG, "ERROR: Failed to initialize instance.*");
}
if (getInstance( ).getWebServer( ).equalsIgnoreCase("YES")){
MainClass tcmain = new MainClass( );
tcmain.start( );
}
getProcessTimer( ).start( ); // port
SingleUtilClass.getInstance( ).updateEventStatus(SingleUtilClass.-getInstance( ).readEventStatusFileNames( ));
//if (getInstance( ).isScheduleDaemonEnabled( ))getMonitorDaemon( ).-start( ); // scheduled
getMonitorDaemon( ).start( );
//if (getInstance( ).isMonitorEnabled( ))getNasMonitor( ).start( );
// monitor
getNasMonitor( ).start( );
if (getInstance( ).isThread1Enabled( )) getTimer1( ).start( ); // heartbeat1
if (getInstance( ).isThread2Enabled( )) getTimer2( ).start( ); // heartbeat2
```

The code shown under the heading of Example F below corresponds to a scheduler thread component of the event manager module which initiates a call to a schedule handler of the system every few seconds. An embodiment of the code for the scheduler handler component is shown in Example G.

Example F

```
if (getInstance( ).isScheduleDaemonEnabled( )) {
if ((getInstance( ).isMonitorDisplayEnabled( )) ) {
//System.out.println(this.-getTodayStringDateYYYYMMDD_HHMMSS( ) + " --> MONITOR DAEMON <-- " + this.getStringTimeInMillSecs( ));}
try
{
//MonitorDaemonHandler monitorDaemon = new MonitorDaemonHandler(getInstance( ).getXmlEventMonitor( ));
if (getInstance( ).canStartSchedule( ))
monitorDaemon.handle( );
else
Logger.debug(Logger.MIN_DEBUG, "--> "+ CmdProperties.-getSoleInstance( ).getUserName( ) +" SCHEDULE is not active." );
} catch (Exception e ){
Logger.debug(Logger.MIN_DEBUG,"Exception catched from MonitorHandler " + e.toString( ) );
}
}
}
```

The code shown under the heading Example G below corresponds to a scheduler handler component of an event manager module, where the scheduler handler component operates to test if it can start an event handler component, for example it will determine if all necessary event parameter information is present for operation of the event handler component, and if so, the event schedule handler component will add the information for the call to the particular event handler component to the container component, which as described above stores events which are to be handled.

Example G

```
while (n.hasMoreElements( )) {
event = (com.xml.docs.objects.EventObject) n.nextElement( );
if (! isEventRunning(event.getName( ))) {
if (canStartEvent(event)) {
this.addEvent2in_queue(event.getName( ),event);
Logger.debug(Logger.MIN_DEBUG,"--> "+event.getName( )+ " added to in_queue container");
}
}
}
```

The code shown below under the heading Example H corresponds to a periodic operator component, or heartbeat component, which reads the event container component, and invokes an event handler component. Thus, this periodic operator component operates to provide for a polling of container to identify events, where it the event manager module should invoke a corresponding event handler to initiate the running of some corresponding operation which could be performed by a service utility. The event manager module can then use the parameter information discussed above to provide contextual information to the service utility, and the service utility will then operate to provide the necessary functions.

Example H

```
private void startEvent(com.xml.docs.objects.EventObject event) {
    String test = "";
    EventMonitor eventMonitor = new EventMonitor(event);
    this.addEvent2in__process(event.getName( ), event);
    this.removeEvent2in__queue(event.getName( ));
    this.incrementThreadCounter( );
    event.setStartTimeinMS(getSUInstance( ).getLastTS( ));
    Logger.debug(Logger.MIN__DEBUG, "--> starting event: " + event.getName( ) + " startId: " + event.getStartTimeinMS( ));
    eventMonitor.start( );
}
```

The code shown below under the heading Example I provides an event handler call component. The event handler call component operates to identify a class of event handlers for handling a particular event, where the class of event handlers is identified by a corresponding event template. The event call component then calls the appropriate event handler component. The event handler call component shown in Table I also operates to handle a response which is generated as a result of the invocation of the event handler component, where the event handler component operates to initiate the operation of a service utility which provides one or more responses.

Example I

```
protected boolean handleEvent( ) throws Exception{
    boolean retValue = false;
    try {
        Class c = Class.forName(getType( ));
        Command com = (Command) c.newInstance( );
        com.execute(getEvent( ), getProcess( ));
        retValue = handle__Alt__(getResponse( ));
    } catch (java.lang.reflect.InvocationTargetException e) {
        e.printStackTrace( );
        retValue = handle__Alt__1(e.toString( )); //runJob(getBadJob( ), "\"" + " (ITE) Failed job:" + getExecutedJob( ) + "\"");
        throw (new Exception("InvocationTargetException thrown by" + getProcess( )));
    } catch (Exception e) {
        e.printStackTrace( );
        retValue = handle__Alt__1(e.toString( )); //runJob(getBadJob( ), "\"" + " (GE) Failed job:" + getExecutedJob( ) + "\"");
        throw (new Exception("Exception thrown by " + getProcess( )));
    } catch (Throwable e) {
        e.printStackTrace( );
        retValue = handle__Alt__1(e.toString( )); //runJob(getBadJob( ), "\"" + " (TE) Failed job:" + getExecutedJob( ) + "\"");
        throw (new Exception("Throwable exception by " + getProcess( )));
    }
    finally {
        //setReadBuffer(true);
    }
}
```

The code shown below under the heading Example J, illustrates an embodiment of an actual event handler which operates to capture the event parameter information from the event template, or in some cases directly from the event object which initially triggered the operation of the particular event template. In one embodiment, the event handler object will pass the event parameter information, which was discussed above in connection with the event templates, on to the service utility which is invoked by the event handler object, and the service utility will operate to use the parameter information, in connection with providing the function required. The event handler will initiate the operation of the service utility in connection with the passing on of the necessary event parameter information.

Example J

```
public class IN__H00002 extends Command {
    CmdUtils utils = new CmdUtils( );
    /* (non-Javadoc)
     * @see com.cmd.base.Command#execute(java.lang.Object, java.lang.String)
     */
    public void execute(Object o, String message) throws Exception {
        EventObject eo = (EventObject) o;
        Logger.debug(Logger.MIN__DEBUG, "--> Event "+ eo.getName( ) + "started."); processRequest(eo);
    }
}
protected void processRequest(EventObject eo) throws Exception {
    String command = eo.getProcess( ).concat(eo.getParam( ));
    try {
        if (getUtils( ).runScript(command)) {
            Logger.debug(Logger.MIN__DEBUG, "--> Successful command executed: " + command );
        } else {
            Logger.debug(Logger.MIN__DEBUG,"--> command FAILED to execute: " + command );
            throw (new Exception("Failed to execute" + command));
        }
    } catch (Exception e){
        Logger.debug(Logger.MIN__DEBUG,"--> cathed exception while executing " + command );
        throw (new Exception("Failed to execute " + command ));
    }
}
```

Figure 8:
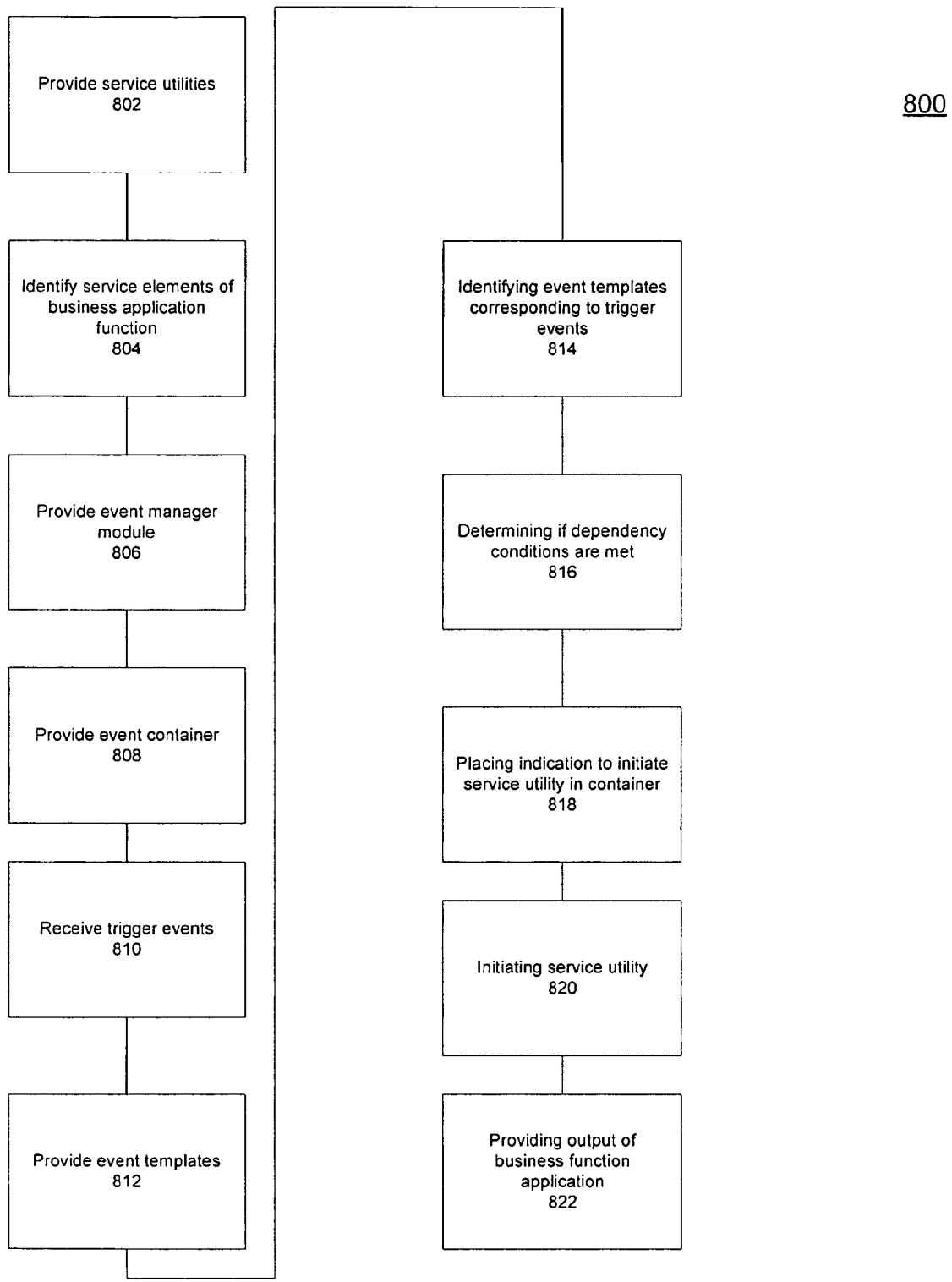
FIG. 8 illustrates an embodiment of a method of the invention herein.

FIG. 8 illustrates an embodiment of a method 800 of the invention herein. The method 800 can be used to implement a number of different business function applications to provide for different services and outputs from a data processing system. The method can utilize an event manager module having the various characteristics and components as discussed above, and the method can utilize the event template component as discussed above. Further, the method provides for using the general service utilities which in many cases will already be provided, for and utilized by other applications, in the data processing system as discussed above. In one embodiment the service utilities will be provided such that they are commonly accessible to event manager modules located and running on different computers in the data processing system.

Initially, the method 800 can be thought of as including three general categories of activities or processes. The first category of activity can be thought of as general planning type of phase which would include elements 802 through 808 of FIG. 8. These steps as described below correspond to identifying the functions or service elements of a business function application which is to be implemented in a data processing system, and in conjunction with this operation the service utilities of the system are also identified, and the general event manager module and its components are provided for. The second category of activity is a set action type of activity where the actions to be taken, and the related triggering events are defined; this type of action generally corresponds to steps 810 through 818 of FIG. 8. The third category of activity is the actual execution of the set activities and corresponds generally to steps 820 and 822 of FIG. 8. Each of these elements is described in more detail below.

Specifically, the method 800 includes providing 802 a plurality of different service utilities in the distributed computing system. The method further includes identifying 804 different service elements of the business function application which is to be implemented in the data processing system. These different service elements require that certain operations be performed in order to provide a result required by the service element, as discussed in more detail above. The service elements can have a corresponding service utility which performs the operation or sets of operations called for by the service element.

The method 800 further provides for providing 806 an event manager module which can contain various different components as describe above. The method can further include providing 808 an event container component in the event manager module.

The method will include receiving 810 various trigger events. These trigger events are events which have a corresponding event templates in the event manager module, and when such an event occurs, a service element of the business function element call for the performance of certain operations, as can be provided for by one of the service utilities. In connection with the various service elements, the method will include providing 812 event templates which can be included in the event manager module. The event templates 812 will each have a corresponding service element, and a service utility. Further, the event template can be provided with an identifier which indicates a triggering event to which the event template will operate in response. When triggering event is received, the event manager module, will operate to identify 814 which event template corresponds to the received triggering event. The event template will determine 816 if dependency conditions are met. If the dependency conditions are met then an indication will be placed 818 in the container to initiate the service utility which corresponds to the event template whose dependency conditions have been met. The event manager module reviews the contents of the container and will operate to initiate 820 operation of the identified service utility. The above process of receiving trigger events and processing the events using event templates will continue until the business function application is completed, and the result of the business function application can then be output 822. This output can be in the form of a wide variety of outputs depending on the given business function application. In the context of a distributed processing system used in brokerage business for example, the output could be the execution of customer request trade transaction, the generation of a customer account balance report, or the transfer of money from one account to another, etc.

In situations where a trigger event has been received, and the event template reviews the dependency conditions and determines that a dependency condition has not been met, the event template can remain in a monitor state where it will continue to monitor the dependency conditions, and then when it detects that all conditions are met it will generate an indication that the corresponding service utility should be initiated, and this indication can be placed into the event container for processing.

The flow chart of FIG. 8 would in many embodiments include a recursive type of operation where one trigger event could be received and lead to the invocation of a event handler which calls a service utility which then results in a response which provides another triggering event which leads to invocation of another event handler and so forth, and this process can repeat itself until the necessary operations of the business function application have been completed.

Figure 10:
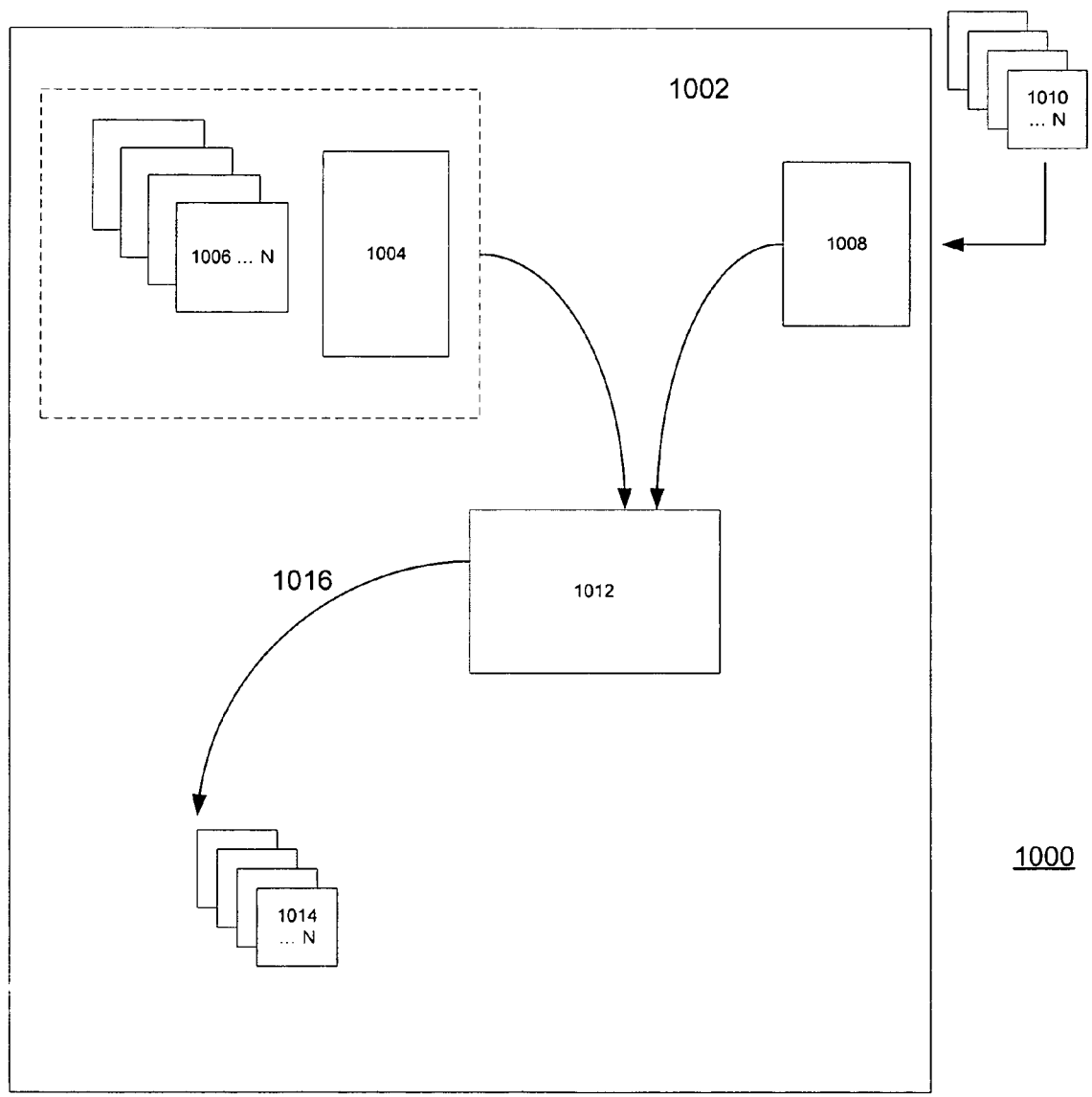
FIG. 10 illustrates an embodiment of a system of the invention herein.

FIG. 10 shows another embodiment 1000 of the system of the invention. In the embodiment 1000 an event manager module 1002 is running in the processor of a computer. The event manager module would include the basic elements of an event manager module as describe above. The event manager module would operate to receive events on an incoming port, or port processing thread 1008. Trigger events as described above would be communicated to their corresponding event templates 1006. Assuming dependency conditions are met, then a scheduler component 1004 of the event manager module 1002 would operate to create an entry in the container module 1012 indicating that a corresponding event handler should be invoked. Additionally, FIG. 10 shows another aspect of an embodiment herein, where events can be received at the incoming port, or processing thread 1008, and these events can contain information identifying them as an event which can be placed directly into the container module 1012. Where an event includes such information, the event is referred to as a self dependent event, and the event manager module will operate to place such an event directly into the container module 1012. The periodic operator component of the event manager module, as discussed above in connection with Example H, provides for a polling operation which operates to identify events in the container module which are ready for invocation 1016 of there corresponding event handler 1014.

It should be noted that the above described embodiments have been described in the context of a functioning data processing system, but those of ordinary skill in the art will appreciate that the embodiments of the system and method herein might also distributed in the form of a computer readable medium of instructions and a variety of forms and that the present invention could be utilized across a wide range of signal bearing media used to carry out the distribution. Examples of computer readable media include recordable-type media such a floppy disc, a hard disk drive, a RAM, and CD-ROMs and transmission-type media such as digital and analog communications links.

The description of embodiments of the present invention is provided for purposes of illustration and description, but is not intended to be exhaustive or limited to the invention in the form disclosed. Many modifications and variations will be apparent to those of ordinary skill in the art. For example, although the depicted architectural pattern is illustrated in a Java, object oriented type programming environment, the architectural pattern of the present invention may be applied to other types of programming environments. For example, VisualBasic, C++ Smalltalk are other programming environments in which the processes of the present invention may be applied. In addition, the discussion of classes and objects and the like are provided for purposes of illustration only. Classes, variables, constructors, and methods may vary depending on the particular implementation. The embodiments above are provided to enable others of ordinary skill in the art to understand the invention for various embodiments with various modifications as are suited to the particular use contemplated.

The above described systems and methods illustrate a number of attributes of embodiments of the invention herein. For example, an embodiment of the invention can drastically reduce the need for custom coding in deployment of new business function applications. The use of event manager modules provides a vehicle by which business function applications can be added to a data processing system by focusing on describing and utilizing existing service utilities. Indeed, in one embodiment an instance of an event manager module residing in one platform, could use an event handler to initiate the operation of service utility residing in a different environment, such that the service utility provides functions required by a business function application running in the environment of the event manager module. For example, the event manager module could be operating in a Windows environment, and the service utility could be operating in a mainframe, or UNIX environment.

Aspects of the operation of an event manager module can be analogized to the operation of a brain cell which builds neural networks and connects all brain areas as a unit. Each cell or group of cells can access resources from any part of the brain and independently command body functions. All neural cells have identical structure but function differently based on individual chemical reactions propagated by electrical events traveling across the body. By analogy the event manager modules have the same structure but respond to events differently depending on the specifics of the event templates in the event manager module.

To use the neural network analogy, the event manager module processes events in a similar way between one or many event manager modules instances. In one embodiment the event manager module can access all resources in a data processing system and satisfy all business functions in a simple, scalable and efficient way.

In one embodiment an event manager module will have the ability to sense or receive a message and using logic, execute an accurate response. An event manager module could forward a request to another event manager module with access to specialized resources then continue or wait for a response before forwarding the request.

An event manager module can be formed by binding a code specific profile, platform resources and application services into a unique event manager module manager object instance. Each event manager module instance is master of its domain and is able to provide access to services it controls. Further each instance of the event manager can be stateless, such that upon instantiation of the event manager module, the module will respond in known manner to events. The stateless aspect of the event manager can provide for asynchronous communication where there is no timing requirement for transmission and in which the start of each communication is individually signaled by the transmitting device.

To continue the brain cell analogy, an event manager module can be thought of has having elements similar to brain neuron components. The event manager module can be thought of as having a nucleus which commands and controls activities. The event manager module also senses and receives events or messages from itself and from other sources including other event manager modules. The sensor components of the event manager can be thought of as dendrites. The event manager module includes handlers which provide for actions or information or instructions transmitted from the event manager module and these elements can be analogized to axons, which handle the actions taken by a cell. The event manager module can communicate based on a circular model where events massages travel across axons, such as events being propagated or generated by handlers, and in both local and remote event manager modules. The event manager module can use any communication channel and protocol for sending messages to event manager modules. In addition to receiving messages by sensing either remote or local incoming messages, the event manager modules can independently select a specific pre-defined event as a response to the incoming message.

The event manager module can be used as a standard or common form of interaction and control across all platforms, such as Windows, mainframe and UNIX environments, and across a range of different applications. Because the event manager module can use generic XML code, its versatility ranges across all forms of electronic communication such as voice, internet, mainframe and any other networked infrastructure.

Figure 9:
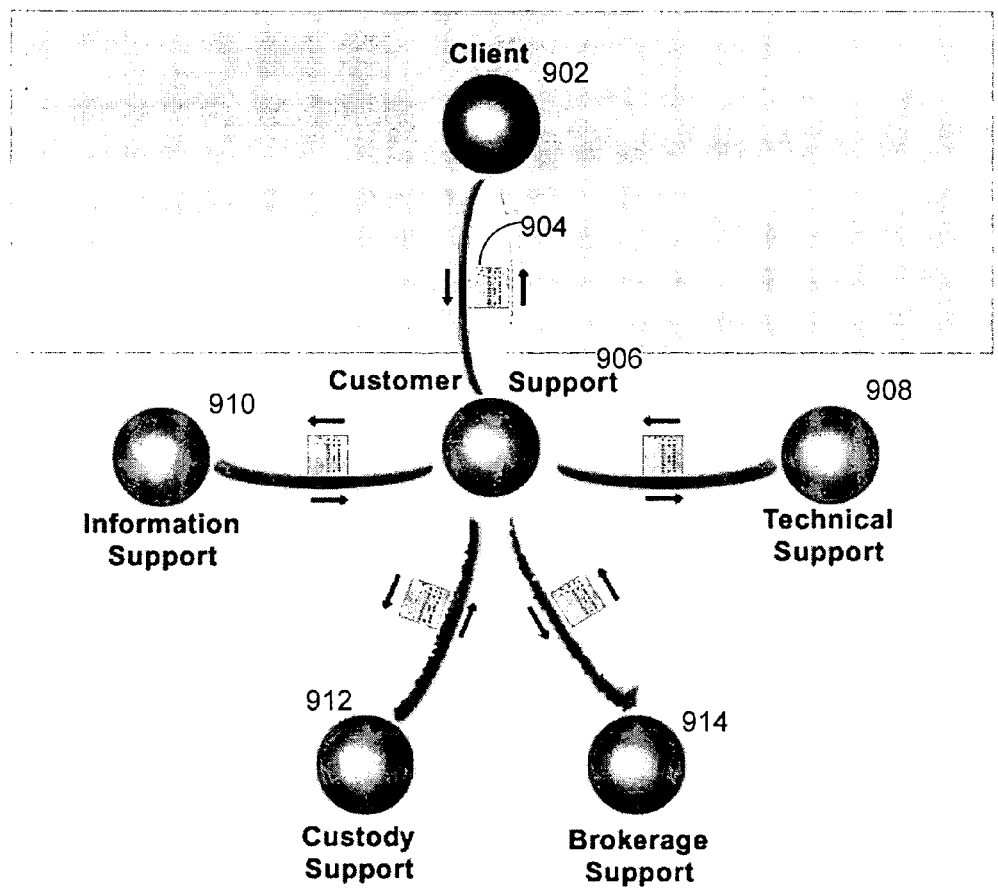
FIG. 9 illustrates an embodiment of a method of operation of the invention herein.

With the above discussion in mind reference is made to FIG. 9, which illustrates an embodiment of system 900 of the invention. The system 900 is shown from the perspective of a customer support computer, shown in FIG. 1. FIG. 9 shows a customer support event manager module node 906. This node 906 represents one or many event manager module instances running within a local or remote domain. Elements 904 represent circular event transactions, which can be an event process of exchanging information or events between different event manager modules. These circular event transactions can include specific event processes which operate to complete operation of service element of a business function application for example, and will generally provide for a sensor, which senses an event, and then some initiation of an action and a corresponding response. The specific event process, for completing some service element function which includes a sensor, an event, and a response, can be referred to as an event manager sequence. The customer support event manager node communicates, and interacts with other event manager module nodes such as information support event manager node 910, client event manager node 902, technical support event manager node 908, brokerage support event manager node 914 and custody support event manager node 912 via circular event transactions, which would include specific event processes as described above. Each of these different event manager nodes can reside on different platforms, and provide access to different service utilities operating in these different platforms.

Although only specific embodiments of the present invention are shown and described herein, the invention is not to be limited by these embodiments. Rather, the scope of the invention is to be defined by these descriptions taken together with the attached claims and their equivalents.

What is claimed is:

1. A data processing system for running a plurality of business function applications, the system including:

An event manager module configured at least to receive a plurality of events and in response thereto manage the invoking of a plurality of different service utilities, the event manager module including a property identifier module which operates to identify resources available to a processor in which the event manager module is instantiated and a container component which operates to store a plurality of instructions identifying a plurality of different event handlers which are to be utilized to invoke the plurality of different service utilities;

wherein a business function application of the plurality of business function applications includes a plurality of different service elements, and each of these service elements has a corresponding service utility selected from the first plurality of different service utilities;

wherein the event manager module includes a plurality of different event templates and a first plurality of sensor objects distinct from the plurality of different event templates, each of the plurality of different event templates corresponding to extensible markup language specifying at least (i) an identifier of an event to which the event template corresponds and (ii) an identifier of an event handler of a plurality of event handlers used to handle the event to which the event template corresponds, wherein an event template is provided for each of the plurality of different service elements, wherein each sensor object is configured at least to sense a triggering event and to identify a corresponding event template for the event manager to invoke, and wherein at least a first event template of the plurality of different event templates has extensible markup language further specifying a dependency condition including one or more identifiers of one or more events other than the event identified by the first event template that must occur before invoking the service utility that corresponds to the template's service element with the event handler identified by the first event template;

wherein the first event manager module operates its sensor objects to identify an event template for each received triggering event and initiates the operation of a service utility for the service element of each event template identified by the sensor objects, and wherein the first event manager waits for the one or more events specified in the first event template's dependency condition to occur before initiating the operation of a service utility for the service element of the first event template with the event handler identified by the first event template; and wherein a plurality of the plurality of different event templates are configured to at least partially implement the business function application, wherein a first such event template is triggered by a first event and responsively initiates (i) operation of the business function application and (ii) generation of at least a second asynchronous event, wherein a second such event template is triggered by the second asynchronous event and responsively initiates a task that results in the generation of at least a third asynchronous event, and wherein a third such event template is triggered by the third asynchronous event and responsively initiates a task different from the task performed by the second such event template.

2. A method of implementing a plurality of business function applications in a data processing system, the method comprising:

providing a plurality of service utilities that are invoked responsive to events received by an event manager module, the event manager module including a property identifier module which operates to identify resources available to a processor in which the event manager module is instantiated and a container component which operates to store a plurality of instructions identifying a plurality of event handlers which are to be utilized to invoke the plurality of service utilities;

identifying a first plurality of service elements, in a first business function application, wherein each of the first plurality of service elements has a corresponding service utility selected from the plurality of service utilities, which performs an operation required by the corresponding service element;

providing a first plurality of event templates wherein each of the first plurality of service elements has a corresponding event template, each event template has a corresponding triggering event, each event template has a corresponding service utility, each event template corresponds to extensible markup language specifying at least (i) an identifier of the corresponding triggering event and (ii) an identifier of an event handler of a plurality of event handlers used to handle the corresponding triggering event, and upon receipt of its corresponding triggering event the event template operates to determine if a dependency condition of the event template has been met, wherein at least one event template has extensible markup language further specifying a dependency condition including one or more identifiers of one or more events other than the event identified by the at least one event template that must occur before invoking the service utility that corresponds to the template's service element with the event handler identified by the at least one event template;

providing a plurality of sensor objects distinct from the first plurality of event templates, each sensor object being configured at least to sense a triggering event of a corresponding event template;

configuring a plurality of the event templates to at least partially implement the first business function application, wherein a first such event template is triggered by a first event and responsively initiates (i) operation of the first business function application and (ii) generation of at least a second asynchronous event, wherein a second such event template is triggered by the second asynchronous event and responsively initiates a task that results in the generation of a third asynchronous event, and wherein a third such event template is triggered by the third asynchronous event and responsively initiates a task different from the task performed by the second such event template; and sensing, by a sensor object, a triggering event for the at least one event template that has a dependency condition and initiating, with the event handler identified by the at least one event template, operation of the service utility corresponding to the at least one event template that has a dependency condition after determining that its dependency condition has been met.

3. The method of claim 2 further including:

providing a first event manager module which includes the first plurality of event templates and the plurality of sensor objects, and operates to receive a plurality of different triggering events and to pass each triggering event to an event template of the first plurality of event templates which corresponds to the received trigger event.

4. The method of claim 2 further including:

identifying a second plurality of service elements, in a second business function application, wherein each of the second plurality of service elements has a corresponding service utility selected from the plurality of service elements, which performs an operation called for by the corresponding service element of the second plurality of service elements;

providing a second plurality of event templates wherein each of the second plurality of service elements has a corresponding event template, and each event template of the second plurality of event templates has a corresponding triggering event, and each event template of the second plurality of event templates has a corresponding service utility which is the same service utility which corresponds to the service element which corresponds the event template of the second plurality of event templates, and upon receipt of its corresponding triggering event the event template of the second plurality of event templates operates to determine if a dependency condition of the event template of the second plurality of event templates has been met;

initiating operation of a service utility after an event template of the second plurality of event templates which corresponds to the service utility has received its corresponding trigger event and determined that its dependency conditions have been met; and wherein at least a first service utility is used to perform an operation for both one of the first plurality of service elements, and one of the second plurality of service elements.

5. The method of claim 3 further including:

providing an event container module in the event manager module;

storing an indication that the first service utility should be initiated in the event container module, after an event template which corresponds to the first service utility has received its corresponding trigger event and determined that its dependency conditions have been met.

6. The method of claim 3 further including:

providing the event manager module with a properties identifier component which operates to identify available resources to the first event manager module upon instantiation of the first event manager module.

7. The method of claim 3 further including:

sensing a remote triggering event which is generated by a service utility, and passing the remote triggering event to an event template.

8. The data processing system of claim 1, wherein the service utility corresponding to one of the event templates generates a triggering event of another of the event templates.

9. The data processing system of claim 1, wherein the first event template has extensible markup language further specifying at least a schedule controlling a timing or frequency with respect to which the service utility is invoked.

10. The data processing system of claim 1, wherein the identifier of the event handler of the first event template is specified by the extensible markup language of more than one of the first plurality of different event templates.

11. The data processing system of claim 1, wherein each event handler corresponds to a thread of execution.

12. The data processing system of claim 1, wherein each event template corresponds to an extensible markup language document.

13. The data processing system of claim 1, wherein the first event template has extensible markup language further specifying a set of parameters to be provided to the service utility that corresponds to the template's service element when the service utility is invoked with the event handler identified by the first event template.

* * * * *